J. H. MITCHELL.
AIR PRESSURE LIMITING DEVICE.
APPLICATION FILED FEB. 26, 1915.
1,233,594.
Patented July 17, 1917.
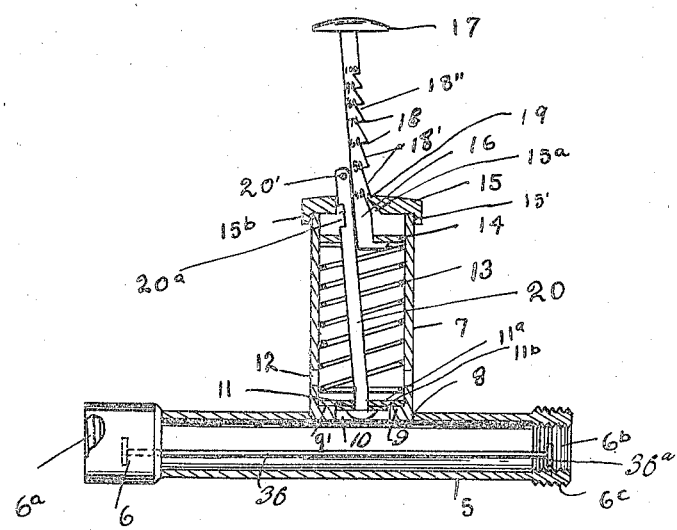
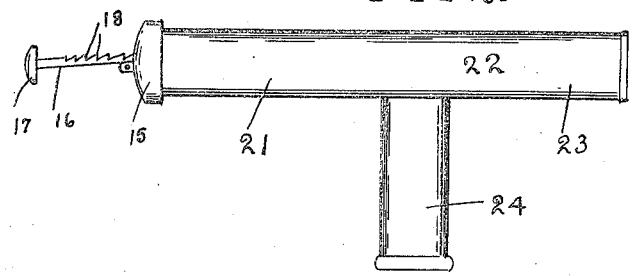
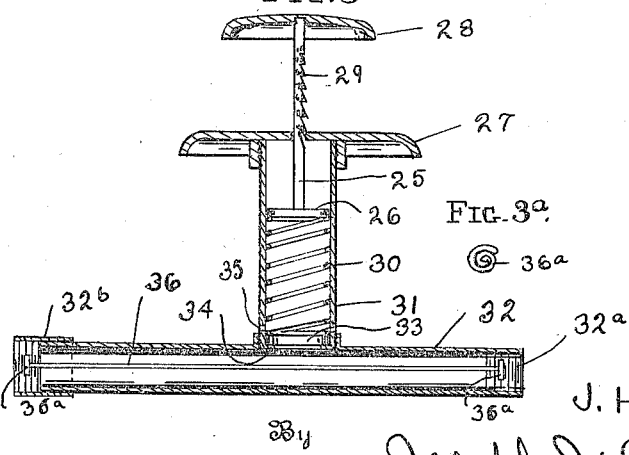
Witnesses
Inventor
J. H. Mitchell
By Joseph J. O'Brien
Attorney

UNITED STATES PATENT OFFICE.

JAMES H. MITCHELL, OF DENVER, COLORADO.

AIR-PRESSURE-LIMITING DEVICE.

1,233,594.  Specification of Letters Patent.  Patented July 17, 1917.

Application filed February 26, 1915. Serial No. 10,707.

*To all whom it may concern:*

Be it known that I, JAMES H. MITCHELL, a citizen of the United States, residing in the city and county of Denver, State of Colorado, have invented certain new and useful Improvements in Air-Pressure-Limiting Devices, of which the following is a specification.

This invention relates to improvements in means for preventing an excessive amount of air from passing into a tire and designed to be operated so that the pressure of air desired to be produced in a tire can be predetermined.

One of the objects of the invention is to provide a simple device which can be interposed between the air tube of a compressor, whether it be a hand pump, a power machine, or a reservoir, and the tire valve tube, and which can be operated so that the air stream will be automatically vented when a predetermined pressure of air has been reached in the tire.

Another object of the invention is the provision of a device for limiting the pressure of air forced into a tire or other air container, with means for adjustably locking the venting valve, so that the valve will remain in normal sealing position until the pressure predetermined has been reached.

With the above and other objects in view the invention embraces certain new and useful combinations, constructions and arrangements of parts, clearly described in the following specification and fully illustrated in the accompanying drawings, in which:—

Figure 1 is a vertical sectional view of the preferred form of the invention.

Fig. 2 is a view in elevation of a modified form of the invention.

Fig. 3 is a vertical sectional view of another modified form of the invention.

Fig. 3ª is a detail of the end of a valve unseating rod, included in the construction shown in Fig. 3.

Referring to the accompanying drawings 5 designates an air conduit, on one end of which is a swiveled sleeve 6, internally threaded, as at 6ª. On the opposite end of the conduit or pipe 5 internal screw threads 6ᵇ and external screw threads 6ᶜ are formed. One end of the pipe or conduit 5 is connectible to the air tube or conduit of a hand or power compressor, and the opposite end thereof is connectible to the valve nipple of the tire, or other device which is to be charged with air under compression. The details of the connection between the tube, pipe or conduit 5 and the tire or like element and the source of compressed air may be varied at will without modifying the principle or the utility of the invention.

The lower end of the pressure limiting cylinder or chamber 7 is threaded at 8 to the wall of the pipe or conduit 5. The cylinder or conduit 7 is provided with an internal valve seat 9, which is formed with a flat upper surface 9′, and which surrounds the air passage 10, through which air can pass from the conduit or pipe 5 to the cylinder or chamber 7.

The air passage 10 is normally closed by the valve 11, which comprises piston elements 11ª and 11ᵇ, which may be of any satisfactory construction. The chamber or cylinder 7 is formed with lateral venting passages 12, located above the valve seat 9 and above the valve 11 when it is in its normal position on said valve seat.

The valve 11 is pressed to its seat by a coiled expansion spring 13, the upper end of which presses against a member or piston 14, which is disposed a distance below the upper end of the chamber or cylinder 7. The upper end of the chamber or cylinder 7 is closed by a cap 15, which is formed with a central opening 15ª. The cap 15 is held in place by engaging screw threads 15′ formed on the upper end of the chamber or cylinder 7 and on the pendant skirt or flange 15ᵇ of said cap.

A pressure determining rod 16 extends through the opening 15ª in the cap 15 and its lower end is rigidly connected to the piston 14, so that by pressing on the upper end of the rod 16 the piston will be forced inwardly, so as to increase the tension of the spring 13. The upper end of the rod 16 extends a considerable distance above the cap 15 and is provided with a teminal button 17, the upper face of which is formed convex, so as to neatly fit into the hollow of the operator's hand. One side of the rod 16 is formed with transverse stops 18, which are longitudinally spaced from each in such relation and in such distances as may be found most desirable. The portions of the rod above each stop are upwardly and inwardly inclined at 18′, so that the notches 18″ are formed in said rod. The stops are numbered from the lowermost stop upward, as in units of 10, the first stop being numbered 40, the second stop 50, and so on until 100 is reached. These numbers are intended to designate pounds of air pressure; as 40 indicates 40 pounds air pressure. Any other system of notation may be used. Each stop is adapted to rest on the relatively sharp edge 19 of the cap 15.

A second rod 20 extends through the cap opening 15ª, and the lower end of said second rod is rigidly connected with the valve 11. The body of the rod 20 is inclined from its point of connection with the valve 11 to its upper end, which normally projects a slight distance above the cap 15. The upper end portion of the rod 20 is formed with a lateral notch 20ª, which is slightly wider than the thickness of the cap 15. A small opening 20' is formed in the terminal portion of the rod 20 above the notch 20ª, through which a suitable instrument, like a nail, may be passed for operating the rod, in case the same does not yield readily to pressure of the operator's hand.

In the position shown in Fig. 1 the rod 16 is set to limit the pressure of air introduced in the container, the tire or other device to be charged with compressed air, at 40 lbs. pressure. When the pressure of air in the conduit or pipe 5 reaches 40 lbs. the valve 11 will be elevated above the vent openings 12, so that the pressure in the air conduit or pipe 5 and in the container, tire or other device can be increased beyond the limit of 40 lbs. predetermined by the setting of the rod 16 on the cap 15. When the valve 11 reaches the venting position the notch 20ª will be brought into horizontal alinement with the opening 15ª and the upper piston will be permitted to yield, together with the rod 16.

In Fig. 2 I show a modified form of the device, in which the testing and venting cylinder 21 is longitudinally alined with the inlet end 22 of the air tube 23, and the outlet branch tube 24 is disposed transversely of the air tube or conduit 23, which has the same function as the tube or pipe 5. This form of the invention is designed for use in connection with an ordinary hand pump.

In Fig. 3 I show another modified form of the invention, in which the releasing rod 20 is dispensed with, and a setting rod 25, similar to the rod 16, is used. The lower end of the setting rod 25 is connected to the piston 26 and the upper end extends above the detachable cap 27 and carries a button 28, designed to fit the hand. The rod 25 is provided with stops 29, which are numbered to indicate different units of air pressure, as previously set forth, and the stops 29 are designed to successively rest on the cap 27. The piston 26 is pressed upwardly by a coiled expansion spring 30, which is inclosed by the cylinder or chamber 31, and which is detachably connected to the conduit or pipe 32, and the lower end of the spring 30 bears on the valve 33, which normally rests on the valve seat 34, which is formed on the lower end of the cylinder or chamber 31. Vent openings 35 are formed in the wall of the cylinder or chamber 21 above the normal position of the valve 33. The conduit 32 is provided with internal screw threads 32ª, or like connecting means, on one end, and with a connecting sleeve 32ᵇ on the opposite end. Within the tube or conduit 32 a valve unseating rod 36 extends, on the opposite ends of which the coils 36ª are formed, which are disposed transversely to the axis of the rod, as shown in Fig. 3ª. One of the coils 36ª is adapted to engage the projecting rim of the usual tire valve, and the other coil is designed to be engaged by a shut-off device of a compressed air tank or reservoir.

The device shown in Fig. 3 is designed for use in connection with air supplied from a reservoir or tank. When the wire rod 36 is in contact with the valve of the tire the opposite end of the rod will actuate the valve controlling the inflow of compressed air, so that as soon as the device is coupled to the tire valved nipple the compressed air will flow through the conduit 32.

It is understood that the specific arrangements shown are intended to be illustrative, and that the exact details of construction may be varied within the scope of the invention, as defined in the following claims.

Having described my invention I desire to secure by Letters Patent:—

1. In combination, an air conduit, a chamber connected thereto and having communication therewith, a valve for normally closing the communication, said chamber having an end cap, a notched rod movable through the end cap and having adjustable locking connection with said cap, and a spring for holding the valve seated and having connection with said notched rod.

2. In combination, an air conduit, a chamber connected thereto and having communication therewith, a valve for controlling said communication, a spring for holding the valve seated, a locking rod for varying the tension of the spring, and a rod for releasing the locking rod when a predetermined pressure is reached in the conduit.

3. In combination, a conduit connectible to an air supply and to a device to be charged with the air, and means in said conduit adapted to engage the controlling valve of the air supply controlling the admission of air into said conduit and adapted to engage the valve of the device to be charged with air to permit of the inflow of air into said device.

4. In combination, a conduit, a rod therein having valve engaging means on its opposite ends, and automatic venting means connected with the conduit.

5. In combination, a conduit, a rod therein having valve operating means on its opposite ends, and variable automatic venting means connected with the conduit.

6. In combination, a conduit, a rod therein having valve operating means on its opposite ends, and means in communication with said conduit for automatically diminishing the pressure in said conduit.

7. In combination, a conduit having open ends to permit the flow of air therethrough, a venting chamber in communication with said conduit, a pressure actuated valve for holding the communication between said chamber and the conduit normally closed, and a free rod located in the conduit and having valve actuating means on its ends.

8. In combination, a conduit having open ends to permit the flow of air therethrough, a venting chamber in communication with the conduit, a valve for closing said communication, a spring adapted to exert tension on the valve, and a notched locking element for holding the valve in its closing position, said element being adapted to lock to the chamber.

JAMES H. MITCHELL.

Witnesses:
  JAMES M. McLANE,
  CHALMERS A. LINDSEY.